(12) United States Patent
Chantrel et al.

(10) Patent No.: US 8,815,100 B2
(45) Date of Patent: Aug. 26, 2014

(54) METHOD AND A DEVICE FOR SEPARATING A MULTIPHASIC LIQUID

(75) Inventors: Paul Chantrel, Veurey Voroize (FR); Marc Bonnissel, Montigny le Bretonneux (FR)

(73) Assignee: Saipem S.A., Montigny le Bretonneux (FR)

( * ) Notice: Subject to any disclaimer, the term of this patent is extended or adjusted under 35 U.S.C. 154(b) by 662 days.

(21) Appl. No.: 12/084,811

(22) PCT Filed: Oct. 25, 2006

(86) PCT No.: PCT/FR2006/051104
§ 371 (c)(1),
(2), (4) Date: May 8, 2008

(87) PCT Pub. No.: WO2007/054651
PCT Pub. Date: May 18, 2007

(65) Prior Publication Data
US 2009/0152204 A1 Jun. 18, 2009

(30) Foreign Application Priority Data
Nov. 9, 2005 (FR) ...................................... 05 11373

(51) Int. Cl.
| | |
|---|---|
| *B04C 5/103* | (2006.01) |
| *B01D 17/038* | (2006.01) |
| *B04C 5/28* | (2006.01) |
| *B01D 19/00* | (2006.01) |
| *B04C 5/04* | (2006.01) |
| *B01D 17/02* | (2006.01) |
| *B04C 5/14* | (2006.01) |
| *B04C 5/181* | (2006.01) |

(52) U.S. Cl.
CPC . *B04C 5/103* (2013.01); *B04C 5/28* (2013.01); *B04C 5/04* (2013.01); *B01D 17/0217* (2013.01); *B01D 19/0057* (2013.01); *B04C 5/14* (2013.01); *B04C 5/181* (2013.01)

USPC ........... 210/788; 210/789; 210/799; 210/718; 210/512.1

(58) Field of Classification Search
CPC ............ B04C 5/04; B04C 5/14; B04C 5/103; B04C 5/107; B04C 5/181; B04C 5/28; B01D 19/0057; B01D 17/0217
USPC ........... 210/512.1, 512.2, 787, 788, 789, 799, 210/718
See application file for complete search history.

(56) References Cited

U.S. PATENT DOCUMENTS 2,590,691 A * 3/1952 Fontein ......................... 209/173
2,811,219 A * 10/1957 Wenzl ............................ 96/167
(Continued)

FOREIGN PATENT DOCUMENTS

| DE | 2046 642 | 3/1972 |
| EP | 0 259 104 A2 | 9/1988 |
(Continued)

OTHER PUBLICATIONS

Written Opinion issued in PCT Application No. PCT/FR2006/051104.

*Primary Examiner* — David C Mellon
(74) *Attorney, Agent, or Firm* — Cozen O'Connor (57) ABSTRACT

The present invention relates to a cyclone type liquid/gas or liquid/liquid separator having separation properties that are stabilized, even when the flow rate and the proportions of the liquid phases for separation vary, by means of a platform situated in the low portion of a cylindrical separation chamber that is fed at its top end via a tangential feed orifice. The present invention also provides an installation and a method of separating the oil and water contained in crude oil, with the help of a cyclone of the invention.

11 Claims, 6 Drawing Sheets

(56) References Cited

U.S. PATENT DOCUMENTS

| | | | |
|---|---|---|---|
| 2,846,024 A * | 8/1958 | Bremi | 55/413 |
| 3,334,516 A * | 8/1967 | Cedrone | 73/61.72 |
| 3,481,118 A * | 12/1969 | Ferris et al. | 55/338 |
| 3,684,093 A * | 8/1972 | Kono et al. | 210/788 |
| 3,764,005 A * | 10/1973 | Zemanek | 209/733 |
| 3,764,008 A * | 10/1973 | Darley et al. | 210/704 |
| 3,822,533 A * | 7/1974 | Oranje | 55/394 |
| 4,005,998 A * | 2/1977 | Gorman | 95/219 |
| 4,414,112 A * | 11/1983 | Simpson et al. | 210/512.1 |
| 4,737,287 A * | 4/1988 | Prendergast | 210/512.2 |
| 4,772,401 A * | 9/1988 | Rawlins | 210/788 |
| 4,971,685 A * | 11/1990 | Stanley et al. | 209/170 |
| 5,116,488 A * | 5/1992 | Torregrossa | 209/170 |
| 5,269,949 A * | 12/1993 | Tuszko et al. | 210/788 |
| 5,322,169 A * | 6/1994 | Tils | 209/170 |
| 6,071,424 A * | 6/2000 | Tuszko et al. | 210/788 |
| 6,398,973 B1 * | 6/2002 | Saunders et al. | 210/788 |
| 6,849,182 B2 * | 2/2005 | Redding | 210/512.1 |
| 2006/0049120 A1 * | 3/2006 | Antoun | 210/787 |

FOREIGN PATENT DOCUMENTS

| | | |
|---|---|---|
| EP | 0473566 A2 | 8/1991 |
| GB | 2 036 606 A | 2/1980 |
| WO | WO 97/15368 | 1/1997 |
| WO | WO 97/28903 | 8/1997 |
| WO | WO 01/87453 A2 | 11/2001 |

* cited by examiner

METHOD AND A DEVICE FOR SEPARATING A MULTIPHASIC LIQUID

PRIORITY CLAIM

This is a U.S. national stage of application No. PCT/FR2006/051104, filed on 25 Oct. 2006. Priority is claimed on the following application: Country: France, Application No.: FR 05 11373, filed: 9 Nov. 2005; the contents of which is incorporated here by reference.

FIELD OF THE INVENTION

The present invention relates to a cyclone type liquid/liquid separator and to a method and an installation for separating a multiphasic liquid, in particular oil and water contained in crude oil.

The technical field of the invention is particularly the field of oil production, and more particularly the field of offshore oil fields at great depth.

BACKGROUND OF THE INVENTION

In general, oil is produced off shore at great depth from a floating support anchored close to oil wells situated on the sea bottom, i.e. at depths that lie in the range 1000 meters (m) to 2500 m, or even more. The floating support generally has anchor means so as to enable it to stay in position in spite of the effects of currents, winds, and swell. It also generally includes storage means and oil treatment means together with means for offloading to tankers, which dock at regular intervals to offload the production. These floating supports are commonly referred to as floating production storage offloading supports, and they are designated by the abbreviation "FPSO" throughout the description below.

In general, well heads are connected to said FPSO by undersea pipes either of the steel catenary riser (SCR) type, i.e. pipes that are suspended in a catenary configuration, or else of the hybrid tower type comprising:
- a vertical riser having its bottom end anchored to the sea bottom and connected to a said pipe resting on the sea bottom, and whose top end is tensioned by a float immersed under the surface and to which it is connected; and
- a link pipe, generally a flexible link pipe, between the top end of said riser and a floating support on the surface, said flexible link pipe presenting, where appropriate and under its own weight, the shape of a dipping catenary curve, i.e. a curve that goes down well below the level of the float before subsequently rising up to said floating support.

The entire crude oil production is thus generally raised on board the FPSO where it is treated in order to separate the oil proper from water, gas, and any sandy components. Once separated, the oil is stored on board, the gas is washed and then delivered to gas turbines to produce the electricity and heating required on board, and any surplus is reinjected into the oil field reservoir so as to restore pressure in said reservoir. After being freed of the sand in suspension, the water is finally rejected to the sea after thorough extraction of any particles of oil, or else it too is reinjected into the reservoir, generally together with additional sea water taken from the sub-surface that generally needs to be added in order to achieve the flow rate needed for injecting water into the reservoir. The extracted sand, which constitutes quantities that are very small, is finally washed and rejected into the sea.

When an oil field begins to be worked, water represents only a small percentage of the crude oil, but after several years, or even several tens of years, water produced can represent 80% to 95% of the production, and installations for separating, treating, and reinjecting water need to be dimensioned accordingly. It is thus necessary to raise to the surface very large quantities of water that are subsequently returned to the sea bottom for reinjection into the oil deposit in the reservoir.

Numerous separator systems have been developed over tens of years for separating liquids, gases, and solids, and in particular for separating oil, water, gas, and particles of sand.

The method commonly used in installations on land is to provide tanks of very large volume, generally in the form of elongate cylinders, with crude oil entering at one end and running along said tank over a period of about 5 minutes (min) during which the various phases separate naturally under gravity so as to reach the second end where the gas is recovered from the top of the tank, the water and the sand from the bottom, and the oil from an intermediate portion. Separators of that type exist in very great variety and they generally incorporate additional internal devices such as horizontal, vertical, or sloping screens, for the purpose of facilitating separation of the phases and preventing them remixing at a subsequent stage.

Unlike the above-described horizontal separators that make use of the force of gravity for performing said separation, cyclone type separators make use of centrifugal force and they are often used because they are compact, however they remain very difficult to operate because they present operating points that are quite narrow, and as a result they do not accommodate large variations in the oil/water and liquid/solid ratios (the term "operating point" being used here to designate an operating region in which volumes of phases of different densities within the cyclone in stable manner). The fluid remains in a separator of that type for a very short length of time, of the order of 0.5 seconds (s), and as a result a very sophisticated monitoring and control system needs to be implemented in order to adjust all of the servo-valves so as to ensure that the parameters of the system can be kept stable about an optimum operating point. Passive type cyclone separators exist in which the separation energy is taken directly from the fluid by creating a loss of head, generally of a few bars. Other variants are based on delivering external energy, by making use of a motor, generally an electric motor driving a device that is generally of the bell type, for the purpose of creating said centrifugal force within the fluid to be separated, such as Dynaclean systems from Neyrtec (France).

Patents WO 97/28903, EP 0 259 104, and WO 97/15368 describe cyclone type liquid/liquid separators of the kind that have a tangential inlet for the fluid for separation, leading to a first portion of the cyclone that is cylindrical, which cylindrical portion is extended by a bottom portion that is conical, tapering only slightly, and of the type described below with reference to FIGS. 1 and 1A to 1E, leading to an axial outlet orifice for the heavy phase (water), while the light phase (oil) is discharged by an axial outlet orifice at the top end of said cylindrical first portion.

As explained below, the centrifugal force of the fluid delivered to the top end of the cyclone via a tangential inlet sets up a central first volume of the light phase (oil) that is surrounded by a peripheral volume of the heavy phase (water).

When the incoming fluid flow rate varies, and particularly when the respective proportions of water and oil in the fluid for treatment vary, it is necessary to adjust the operating parameters of the cyclone in particular so as to avoid pockets of oil separating and being entrained with the water.

OBJECTS AND SUMMARY OF THE INVENTION

An object of the present invention is to provide an improved cyclone type liquid/liquid separation device that makes it possible to stabilize its operation and to avoid disturbances affecting the quality of separation in the event of a variation in the flow rate, and above all in the event of a variation in the water/oil ratio of the crude oil for treatment.

More generally, an object of the present invention is to provide improved devices, installations, and methods for separating water and oil in order to treat crude oil, and more particularly in order to do so at great depth.

To this end, the present invention provides a liquid/liquid separation cyclone for separating two liquid phases of different densities in a fluid, in particular aqueous and oil phases in crude oil, the cyclone comprising:
- a separation chamber having a wall that forms a surface of revolution that extends between:
  - at least one tangential admission orifice for the fluid to be separated and a top axial outlet orifice for the lower density liquid phase at the top end of said chamber; and
  - a bottom outlet orifice for the higher density liquid phase, said separation chamber comprises a single cylindrical body extending at least between said admission orifices and a platform on the same axis XX' as said cylindrical body, the platform being of diameter smaller than that of said cylindrical body and being positioned over said bottom outlet orifice, such that two volumes are created under the effect of the fluid for separation entering via said tangential admission orifice(s), the volumes comprising a central volume of lower density liquid phase, in particular oil phase, in the form of a substantially cylindrical central column supported by said platform, and an annular peripheral volume of the higher density phase surrounding said central column, enabling the lower density liquid phase to be discharged via said top axial outlet orifice and said higher density liquid phase to be discharged via said bottom outlet orifice.

It will be understood that said two coaxial volumes are created by centrifuging under the effect of the centrifugal force entering tangentially via said admission orifices.

Advantageously, the interface between said two volumes can move radially on said platform when the relative proportions of the two liquid phases making up the composition of the fluid for separation vary, without affecting the separation of said two liquid phases.

As explained in greater detail in the description below, the platform at the bottom of the separation chamber of the cyclone of the invention serves as a support for the coaxial volumes of oil and of water, that are respectively cylindrical and annular (or tubular), as formed by the centrifugal force of the fluid entering tangentially at the top end, and it enables the radial position of the oil/water interface to vary, which interface can move along the diameter of said platform without affecting the separation of the coaxial volumes of oil and of water, even when the relative proportion of the contents of oil and of water in the treated crude oil varies.

The cyclone of the invention also presents the advantage of enabling separation to be performed in stabilized manner, while simultaneously presenting a size that is relatively small compared with conventional cyclones.

In a particular embodiment, the diameter of said platform lies in the range ½ to $^{98}/_{100}$ of the diameter of said cylindrical body, and is preferably at least ¾ thereof.

In a first variant, said separation chamber is constituted by a single cylindrical body extending between said admission orifice and said bottom outlet orifice, said bottom outlet orifice being a tangential outlet orifice, and said platform being positioned at the bottom end of said cylindrical body immediately upstream from said bottom tangential outlet orifice.

In a second variant, the bottom portion of said chamber situated between said platform and said bottom outlet orifice is conical in shape about the same axis XX' as said cylindrical body, and said bottom orifice is an axial outlet orifice extending in the axial direction XX' of said cylindrical body.

This second variant presents the advantage of increasing the head loss of the water reaching said axial outlet orifice, so as to ensure that the pressure of the discharged water is substantially identical to the pressure of the oil phase liquid leaving via said axial top outlet orifice, with this being done by adjusting the respective diameters of said axial top and bottom orifices, said bottom outlet orifice for the heavy liquid phase having a diameter greater than said top outlet orifice for the light liquid phase.

This balance between the outlet pressures of the oil and aqueous phases makes it possible to stabilize the operation of the installation and of a separation method, as explained below.

Preferably, said cyclone includes head-loss means at said bottom outlet orifice for reducing the pressure of the aqueous heavy phase at the outlet from said separator, preferably means for imparting head loss proportional to the acceleration of the fluid, such as a perforated plate or a diaphragm, located downstream from said bottom outlet orifice of said liquid/liquid separation cyclone.

This characteristic makes it possible to self-regulate the stabilization of the operation of a separation installation comprising a cyclone of the invention by equalizing the pressures of the oil and of the water leaving the cyclone in the context of a method of the invention, involving the use of an installation of this type, and as explained below.

The present invention also provides an installation for separating at least two liquid phases of different densities in a fluid that also contains gas, preferably at least the oil and the water of crude oil comprising oil, water, particles of sand, and gas, the installation comprising:
  a) at least one cyclone type liquid/gas separator, preferably in at least one first enclosure; and
  b) at least one cyclone type liquid/liquid separator of the invention, connected to said liquid/gas separator via a first pipe for feeding degassed oil; and
  c) at least one main enclosure, said main enclosure being connected:
    to said liquid/gas separator by a gas feed pipe, where appropriate from the top portion of said first enclosure to the high portion of said main enclosure, said gas feed pipe being fitted with a valve suitable for controlling the pressure of the gas; and
    to said cyclone type liquid/liquid separator by two pipes extending from the top and bottom outlet orifices for the oil and aqueous phases respectively and opening out into two distinct zones of said main enclosure;
    said main enclosure further comprising pipes for discharging the water and the oil separately.

As mentioned above, the installation of the invention advantageously comprises head-loss means suitable for imparting head loss proportional to the acceleration of the fluid, preferably a perforated plate or a diaphragm downstream from said bottom outlet orifice of said liquid/liquid separation cyclone.

More particularly, in an installation of the present invention, said main enclosure comprises, respectively:
- in an oil accumulation zone a device for controlling the discharging of oil and/or said gas via a common pipe; and
- in a water accumulation zone, a device for controlling the discharging of water separated from said solid particles via a distinct pipe in the bottom portion of said main enclosure, and an orifice for discharging said solid particles at the bottom of said main enclosure.

According to more particular and advantageous characteristics:
- said device for controlling the discharging of water separated from said solid particles is constituted by an automatic valve controlled by a float suitable for shutting off water discharge when the level of water drops below a given level, and suitable for allowing water discharge when the level rises above said level; and
- said device for controlling the discharging of oil and/or said gas in a common pipe is constituted by a cylindrical collector connected to said pipe for discharging oil and/or gas, said collector comprising a cylindrical wall that is perforated at different levels up the height of said collector and suitable for allowing gas to be discharged via the perforations situated above the level of the oil and allowing oil to be discharged via the perforations situated below the level of the oil.

In a first particular embodiment, said two distinct zones in said main enclosure are separated by an internal partition suitable for allowing only said gas to communicate between the two zones.

In another particular embodiment, said main enclosure does not include an internal partition and said oil and aqueous phases recovered separately at the outlets from said liquid/liquid separators (2) are delivered into said two distinct two zones of said main enclosure (5) that are separated merely by natural gravity as created by the difference in density between water and oil.

Advantageously, an installation of the invention comprises a series of said cyclone type liquid/liquid separators connected in parallel.

Also preferably, said liquid/liquid separator(s) is/are placed inside said main enclosure, the outlet orifices for the oil and water phases delivered by said cyclone type liquid/liquid separator(s) communicating respectively with said distinct zones for accumulating oil and for accumulating water in said main enclosure.

In a particular embodiment, said main enclosure is installed on land or on board a floating support, and is preferably in the form of a cylinder with rounded end walls.

In another embodiment, said main enclosure is spherical in shape and is installed at the sea bottom.

Preferably, said main enclosures and said cyclone type liquid/liquid separators are distributed symmetrically.

The installation of the invention makes it possible to perform a method of separating at least the oil and the water of a crude oil that also comprises gas and possibly particles of sand, in which the following successive steps are performed:
1) at least partially degassing said crude oil with the help of a said liquid/gas separator, preferably of the cyclone type in at least a first enclosure; and
2) separating the water contained in said degassed crude oil obtained in step 1) so as to obtain an oil phase and an aqueous phase containing said solid particles, with the help of at least one cyclone type liquid/liquid separator; and
3) performing an additional step of stabilizing and regulating the operation of said liquid/liquid separator(s) of step 2) by delivering the gas, oil phase, and aqueous phase streams coming from said separators of steps 1) and 2) into a common said main enclosure at substantially the same pressure in order to obtain controlled levels of oil and water in said main enclosure:
- said gas flow being recovered from the high portion of said first enclosure and sent under pressure controlled by a valve into the high portion of said main enclosure; and
- the pressure of said aqueous phase recovered at the outlet of said liquid/liquid separator being reduced by said head-loss means to obtain a pressure that is substantially identical to the pressure of said oil phase at the outlet from said cyclone type liquid/liquid separator step 2).

More particularly, the levels of the oil and water liquid phases in said two distinct zones of said main enclosure are regulated by said device for controlling the discharge of oil and/or said gas into a common pipe, and by said device for controlling the discharge of water.

Still more particularly, the control of said valve for controlling the pressure of gas at the outlet from said first enclosure is performed as a function of the level of oil in said first enclosure, which level is preferably maintained substantially constant.

BRIEF DESCRIPTION OF THE DRAWINGS

Other characteristics and advantages of the present invention appear in the light of the following detailed description of embodiments given with reference to FIGS. 1 to 7.

DETAILED DESCRIPTION OF THE PRESENTLY PREFERRED EMBODIMENTS

Figure 1:
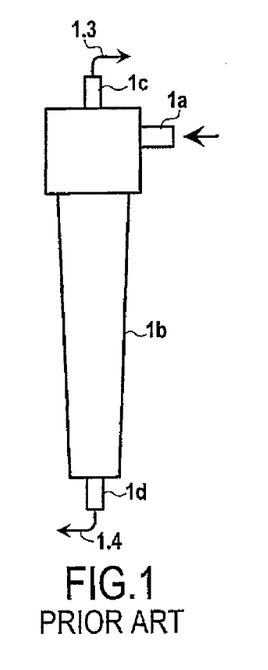
FIG. 1 is a side view of a conventional cyclone for liquid/liquid separation.
Figure 1A:
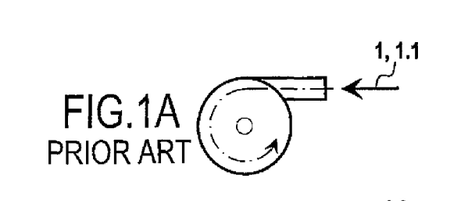
FIG. 1A is a plan view relating to FIG. 1.
Figure 1B:
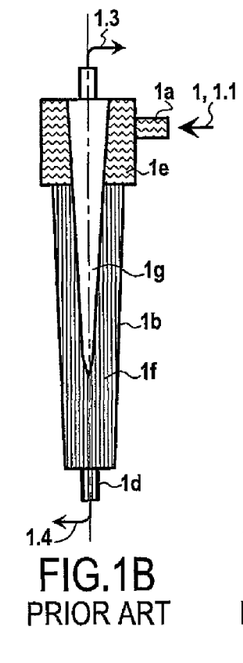
FIGS. 1B, 1C, 1D, and 1E are side views of the fluid stream within a conventional cyclone respectively in a medium configuration (FIG. 1B), a minimum configuration (FIG. 1C), a maximum configuration (FIG. 1D), and a maximum configuration with separation of a bubble of oil (FIG. 1E)
Figure 1C:
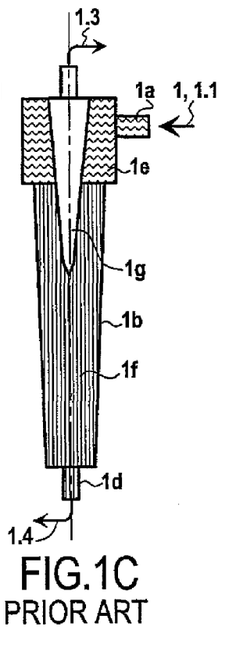
Figure 1D:
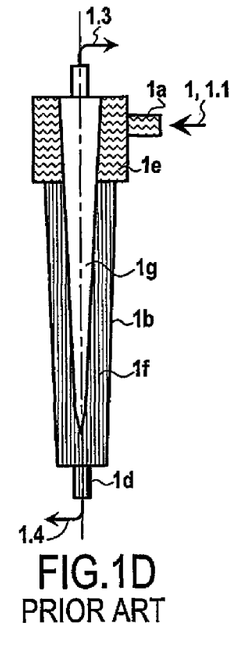

FIG. 1 shows a conventional cyclone 1 for liquid/gas, solid/gas, or liquid/liquid separation, presenting a tangential inlet 1a for fluid for separation 1.1, a tapered cylindrical body 1b, a top axial outlet 1c, and a bottom axial outlet 1d. The fluid 1.1 entering tangentially at 1a under high pressure and at a high flow rate begins to swirl around in the top portion 1e, and the centrifugal force created within the fluid creates acceleration that may be as high as 1000 g, thereby pressing the heavier particles against the tapering cylindrical surface of the wall, with the lighter particles remaining close to the center, as shown in FIG. 1B, which correspond to a mean operating point of the cyclone. When separating oil and water, there can thus be seen in FIG. 1B a strongly swirling top zone 1e in which the water and the oil begin to separate in the cylindrical top portion, and then going downwards, in the tapering portion of the cyclone, the water is to be found in the peripheral zone 1f and the particles of oil coalesce with one another and, because of their lower density, they move towards the axis of the cyclone and they aggregate in a central cone 1g constituted almost completely of crude oil separated from its water. because of the pressure gradient that exists within the cyclone between the wall and the axis of said cyclone, and because of the upwardly-flared conical shape, the water 1.4 (heavy phase) discharges naturally downwards while the oil 1.3 (light phase) discharges towards the top orifice. The device is controlled continuously by means of servo-controlled valves under real-time control, not only at the inlet 1a but also at the outlet orifices 1c and 1d. In the event of sudden changes in the parameters of the incoming stream of fluid (variations in flow rate, variations in the water/oil ratio, . . . ), the control and monitoring system needs to respond sufficiently quickly and accurately to reconfigure the state of said control valves so that the system continues to provide good fluid separation. Thus, the mean size of the cone of oil 1g shown in FIG. 1B may become smaller as shown in FIG. 1C when the percentage of water in the crude increases or if the servo-controlled valve relating to the outlet 1d is closed too much. The cone can also lengthen downwards as shown in FIG. 1D if said percentage of water decreases or if the servo-controlled valve relating to the outlet 1d is opened too much. In the extreme circumstances shown in FIG. 1E, generally corresponding to transient stages of short duration, or to an inability of the system to self-stabilize, pockets of oil 1h can become separated from the oil cone 1g at its bottom and be entrained in the flow of water leaving via the orifice 1d, thereby severely disturbing the quality of separation.

That type of cyclone generally presents an inside diameter in its cylindrical portion lying in the range 50 millimeters (mm) to 75 mm and a height of about 2 m to 2.5 m. The conical portion enables the fluid traveling downwards through the cyclone to conserve a high level of acceleration all along its travel, in spite of the loss of energy generated by friction against the walls of the cyclone.

Such cyclones have a unit flow rate that is rather small and they are generally installed in parallel within an enclosure. They are described above as being in the vertical position, but since the separation effect is based on the principle of centrifugal force, it is in fact possible for them to be installed in any position, and they are often installed in a horizontal position.

Figures 2, 2A, 2C:
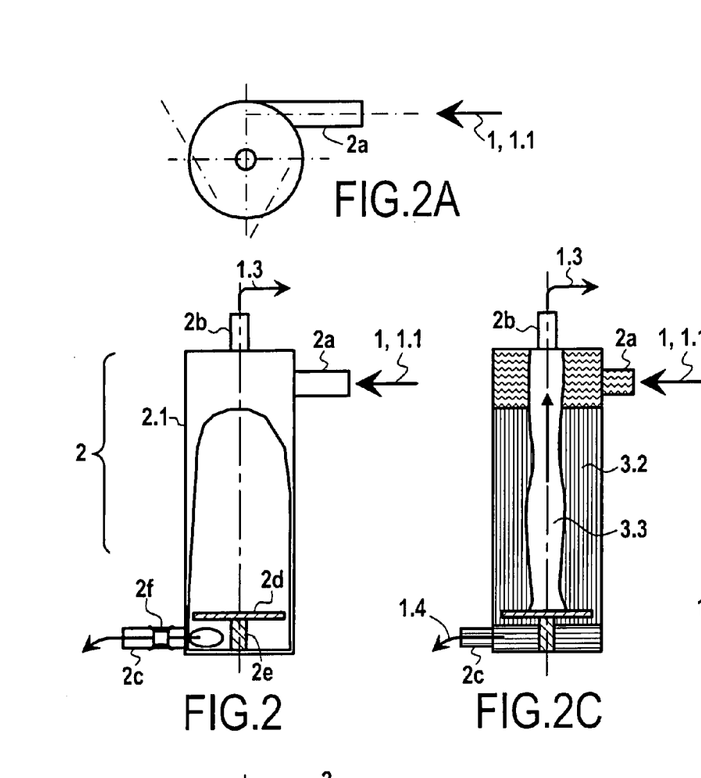
FIG. 2 is a cutaway side view of a cyclone of the invention for liquid gas/liquid separation.
FIGS. 2A and 2B are respectively a view from above and a view from below relating to FIG. 2.
FIGS. 2C, 2D, and 2E are side views of the fluid stream within a cyclone of the invention respectively in a medium configuration (FIG. 2C), a minimum configuration (FIG. 2D), and a maximum configuration (FIG. 2E)
Figure 2B:
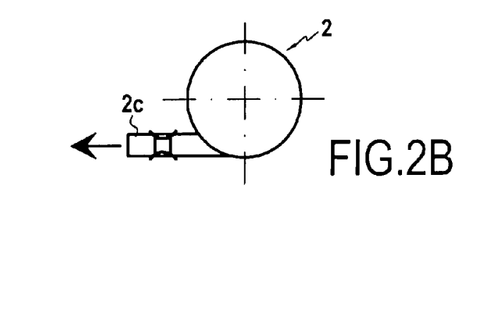

FIG. 2 is a cutaway side view showing a cyclone of the invention constituted by a cylindrical body 2 which presents at least one tangential admission orifice 2a to said cylindrical body in its top portion, and a tangential outlet orifice 2c situated in the bottom portion of said cylindrical body. A preferably circular platform 2d of diameter slightly smaller than the inside diameter of said cylindrical body is secured to said cylindrical body, preferably via its bottom, by means of an axial support 2e.

FIG. 2C is a side view in section showing the fluid stream within the cyclone of the invention. The crude oil 1, possibly degassed crude oil 1.1, enters tangentially via the inlet orifice 2a and swirls at high speed in the top zone 3.1 under the effect of centrifugal force with the water beginning to separate from the oil. In the middle portion of the cyclone, the water is centrifuged outwards to 3.2, while the oil collects in the center to form a substantially cylindrical column 3.3, and it is discharged via the top orifice 2b. In the bottom portion, said column of oil comes into abutment against the platform 2d, and it is shown in a medium configuration in FIG. 2C. To clarify explanations, the column of oil being treated is presented in FIGS. 2C-2E as being substantially cylindrical in shape about an axis ZZ with a generator line that is sinuous along its height, whereas in reality providing the incoming flow is distributed symmetrically over at least two inlets 2a that are positioned symmetrically relative to the axis of said cyclone, the considerable centrifugal force effects acting on the water/oil interface cause this interface to be practically cylindrical with a generator line that is practically rectilinear.

Figure 2D:
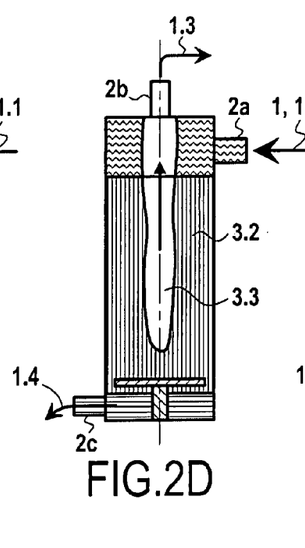
Figure 2E:
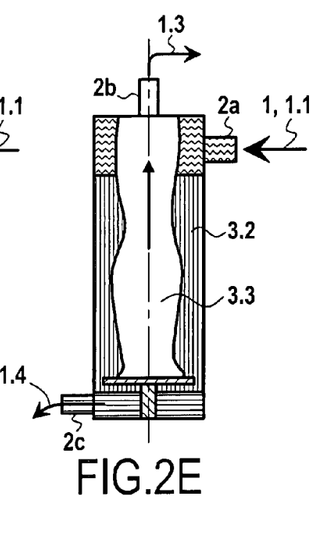

In FIG. 2D, because of a high percentage of water in the crude oil, said column 3.2 does not reach down as far as said platform 2d, whereas in FIG. 2E, corresponding only to a small percentage of water in the crude oil, said column increases in diameter, but without reaching the edge of said platform 2d, where reaching the edge would have the effect of allowing oil to escape via the bottom orifice 2c together with the water being discharged. Thus, the platform 2d associated with a cyclone body of slightly greater inside diameter creates a bottom abutment for the oil column, thus allowing said column to vary in diameter over a considerable range, and thus allowing the oil/water ratio to vary as well, without oil being entrained together with water. Thus, unlike the prior art, that requires an incoming flow of crude oil to present a composition in terms of percentage water to percentage oil that lies in a narrow range so as to make it possible for the control system acting on the controlled valves to keep the liquids in a stable state, the cyclone of the invention presents an operating range that is five or even ten times greater, thereby greatly simplifying the system for controlling the valves and enabling it to be reduced to a minimum, as explained in greater detail below.

Figure 4:
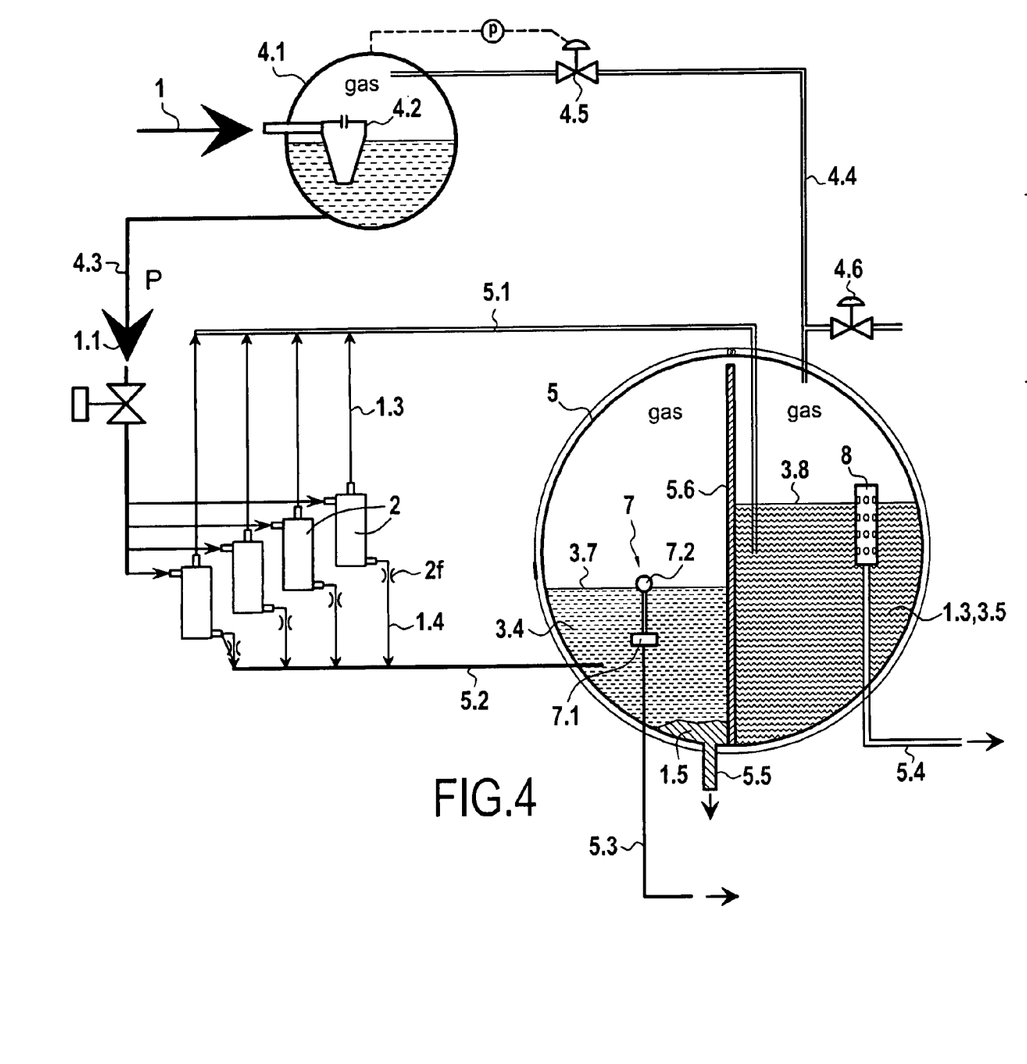
FIG. 4 is a side view of a separation installation of the invention comprising primary gas/liquid separation, and a set of cyclones of the invention connected to a spherical main enclosure for rejection and settling purposes, and fitted with a vertical transverse partition.

FIG. 4 is a side view in section showing a first version of an installation of the invention incorporating a series of cyclones 2 of the invention connected in parallel and fed with a flow of crude oil 4 entering a first liquid/gas separation stage that is constituted in known manner by a first enclosure 4.1 that withstands pressure and by a conventional cyclone 4.2, the partially degassed oil escaping from the bottom portion of said first enclosure via a pipe 4.3 to be directed to the cyclones 2 that are installed in parallel. The gas is recovered from the top portion of said first enclosure 4.1 and then delivered via a pipe 4.4 to a main rejection and settling enclosure 5 that serves to stabilize the flows of oil, gas, and water.

The main enclosure 5 is constituted by a pressure-withstanding tank:
the main enclosure 5 is fed:
from the top with partially degassed oil, via a pipe 5.1 coming from the top axial outlet orifices 2b of the set of cyclones 2 connected in parallel;
from the bottom with water coming from the tangential bottom orifices 2c of the set of cyclones 2 connected in parallel;
with gas via the pipe 4.4 coming from the primary fluid/gas separation stage 4.1-4.2, the pressure of said gas being controlled in real time by the servo-controlled valve 4.5, maintaining a substantially constant level of degassed oil within the first enclosure 4.1; and
the main enclosure 5 includes:
a water outlet pipe 5.3 situated in its bottom portion;
a common outlet pipe 5.4 for oil and gas;
a sand discharge orifice 5.5 for discharging the sand that accumulates in the bottom of said main enclosure 5 in the zone 3.4 where water 1.4 accumulates;
an internal partition 5.6 confining the oil in leaktight manner to the right 3.5 and the water to the left 3.4, but open at the top so as to allow gas to pass between the top of the partition and the wall of the main enclosure 5;
a device 7 for controlling the discharge of water via the pipe 5.3; and
a device 8 for controlling the discharge of gas and oil via the pipe 5.4.

Figure 5:
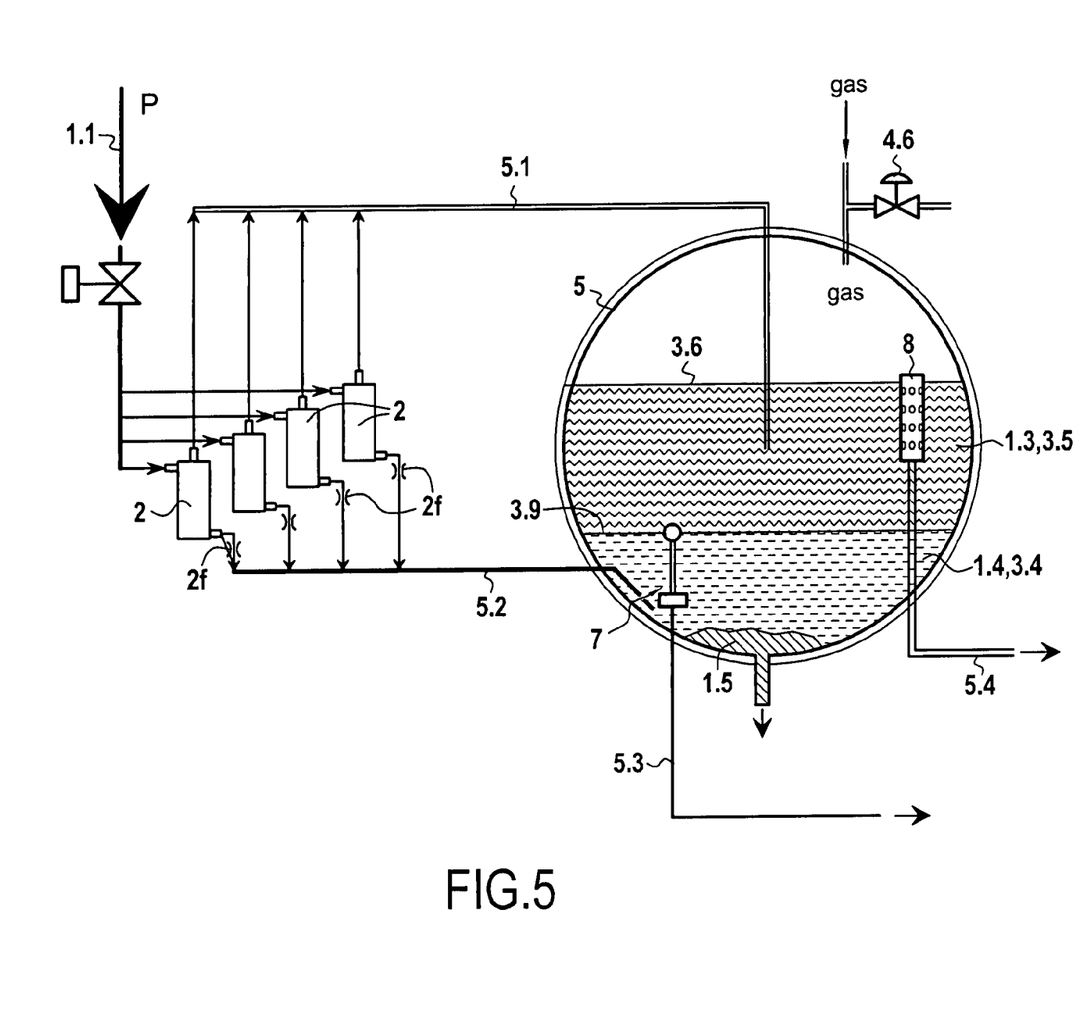
FIG. 5 is a side view of a separation installation of the invention similar to that of FIG. 4, in which the water and the oil are separated naturally by density difference, the main rejection and settling enclosure thus lacking a vertical transverse partition.
Figure 6:
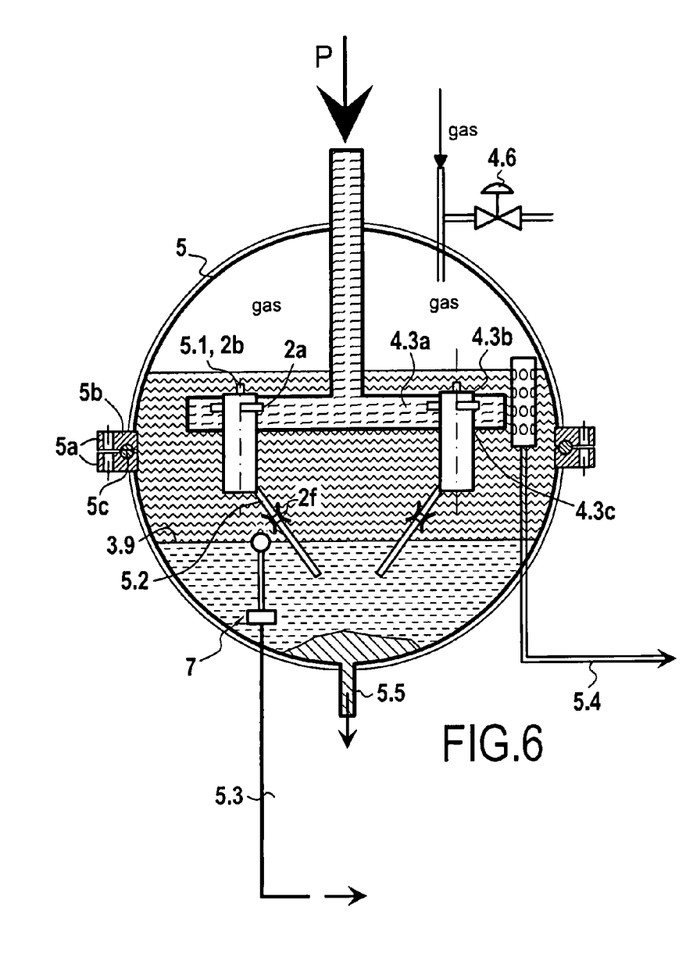
FIG. 6 is a side view in section of a separation installation of the invention, in which the set of cyclones is installed inside the main rejection and settling enclosure.

The device 7 for controlling the discharge of water is constituted by an automatic valve 7.1 controlled by a float 7.2 that closes the outlet when the level is low. In FIG. 4, the valve 7.1 is shown in its closed position, and as soon as the water level rises within the main enclosure 5, the float 7.2 opens the valve 7.1, thus allowing water to be discharged under drive from the gas pressure. In FIGS. 5 and 6, the float 7.2 is positioned at the oil/water interface 3.9.

The device for controlling the discharge of oil and gas is constituted by a collector 8 having a perforated wall that is cylindrical, preferably that is circularly cylindrical, and more preferably that is of constant section over its height, and that is connected in leaktight manner to the discharge pipe 5.4.

Figure 4A:
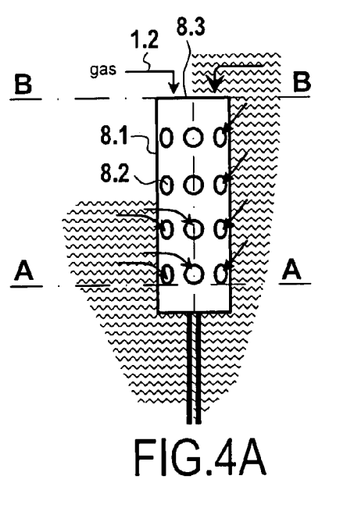
FIG. 4A is a detail view relating to FIG. 4, showing a device for controlling the discharging of oil and gas by drawing off and mixing the gas/oil phases for long-range export.
Figure 4B:
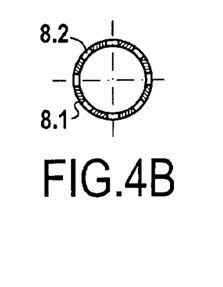
FIG. 4B is a section of said control device as shown in FIG. 4A.

The operation of the device 8 is explained with reference to FIG. 4A:
the body of the collector 8.1 is pierced by a multitude of calibrated holes 8.2, that are preferably identical up its height, and that are distributed in preferably uniform manner around its periphery, as shown in FIG. 4B;
when the level of oil in the main enclosure lies below the top limit of the collector, i.e. below the plane BB, as shown in the left-hand portion of the figure, then the oil passes through the orifices 8.2 and is discharged via the pipe 5.4. The gas, of pressure that increases inside said enclosure, is also discharged via the same pipe 5.4, thereby reconstituting an oil/gas mixture, which is initially a two-phase mixture, but which, after traveling a certain distance through the installation, or on the fluid being recompressed, can become a single-phase fluid by the gas dissolving in the oil;
when the level of oil in the main enclosure is below the lowest holes, i.e. below the plane AA, oil is no longer discharged, and only gas is discharged by the pipe 5.4; and
when the level of oil in the main enclosure is above the plane BB, then gas is no longer discharged and only oil is discharged, not only via the side holes 8.2 but also via the top orifice 8.3 of the collector, as shown in the right-hand portion of the figure.

It can be necessary to take off a fraction of the gas in order to reinject it directly into the deposit, or indeed to send it directly to some other destination. The controlled valve 4.6 thus makes it possible to control the quantity of gas that is taken off, with all of the surplus being passed through the main enclosure, together with oil to the surface, by means of the pipe 5.4.

FIG. 5 shows a second variant of a separator installation of the invention in which water/oil separation is not provided by a partition 5.6, but by natural gravity separation caused by the difference in density between water and oil. The water 1.4 lies in the bottom portion 3.4 of the main enclosure where sand deposits also collect, whereas the oil 1.3 lies thereabove in the upper portion 3.5, with gas occupying the top of the enclosure. In this figure, the primary fluid/gas separation unit 4.1-4.2 and the servo-controlled valve for controlling gas 4.5 are not shown, however the operation of the device as a whole remains identical.

This second variant presents the advantage of providing an additional stage of water/oil separation, since if any particles of oil remain in the water coming from the cyclones, these particles migrate naturally towards the layer of oil by the gravity effect. Similarly, any traces of water in the oil have the opportunity to migrate downwards to rejoin the aqueous zone. Nevertheless, it is necessary for the oil to present density that is much less than that of the water so as to be sure that the water and the oil separate correctly, and thus present a stable interface, so this configuration operates better with light crudes.

In FIGS. 2, 4, 5, and 6, there can be seen head-loss means 2f constituted by diaphragms downstream from the bottom outlet orifices 2c for the aqueous phase from the liquid/liquid separation cyclones 2 of the invention.

Head-loss means of this type generate a loss of head that is proportional to the level of acceleration, and thus to the square of the flow rate of the fluid passing therethrough, thus proving a self-regulation effect for the installation when, as explained below, it is desired to reduce the pressure of the aqueous phase at the outlet from the cyclone type separator in order to stabilize the operation of the separation installation.

Figure 3:
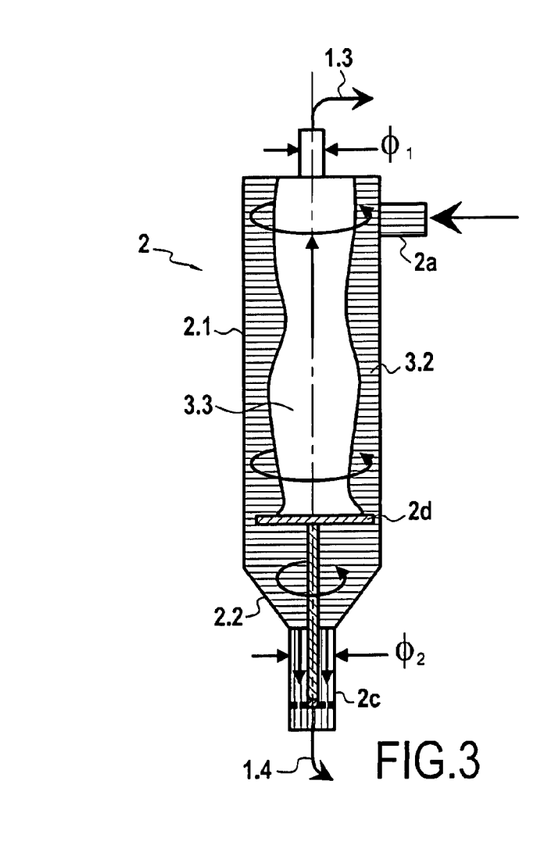
FIG. 3 is a side view in section showing a variant cyclone of the invention presenting a steeply conical bottom and an axial orifice for discharging water.

FIG. 3 is a side view in section of a cyclone of the invention with axial discharge at the bottom. The bottom portion 2.2 of the cyclone is then conical with a vertex angle 30 of 60°, the platform 2d no longer being supported by the bottom of the cyclone, but via the axial discharge pipe at the axial bottom orifice 2c, in a zone where the swirling effect is no longer necessary for the cyclone separation process. The diameter φ2 of the water discharge pipe at the bottom orifice 2c is greater, e.g. by 50%, than the diameter φ1 of the pipe for discharging oil from the top axial outlet orifice 2b, with the difference in diameter corresponding to the head loss created by the above-described perforated plates or diaphragms 2f having the function of making the device self-regulating. The conical shape 2.2 of the bottom of the chamber 2 enables sand to be entrained together with the discharged water.

In the cyclone of the invention, the pressure of the heavy phase (water) extracted from close to the outside wall of the chamber 2 is greater than the outlet pressure of the light phase (oil). The difference between these two pressures is related directly to the mean acceleration of the fluid inside the cyclone and to the radial position of the oil/water interface on the bottom plate, as shown in FIG. 2E.

In the separation method of the invention, in order to stabilize the operation of the installation, a reference pressure is imparted that is substantially identical for both the top outlet orifice 2b and the bottom outlet orifice 2c of the cyclone, by connecting them to a common rejection enclosure constituted by the main enclosure 7, and by reducing the pressure of the water downstream from said bottom orifice 2c in such a manner as to make it substantially equal to the pressure of the oil exiting via the axial top orifice 2b. The installation is made self-regulating by imparting a head loss to the heavy phase (water) outlet that is proportional to its acceleration level, and thus to the square of its flow rate, e.g. by means of a perforated plate or diaphragm 2f that is interposed at each of the bottom outlet orifices from each of the cyclones, said means creating identical head losses for all of the cyclones of the device, or else by providing a chamber portion at the foot of each cyclone in which the residual rotation on outlet is conserved, with the final outlet being via a radius close to the axis, as shown in FIG. 3.

The installation of the invention made up of a set of cyclones of the invention associated with a main enclosure 5 as shown in FIGS. 4 to 6, thus presents a self-regulating character.

Thus, variations in the percentages of incoming water and crude oil correspond, in the configuration of FIG. 5, to the free surface 3.6 of the light liquid phase (oil) moving between maximum and minimum limit positions, and in the configuration of FIG. 4, to a difference of level between the water/gas interface 3.7 and the oil/gas interface 3.8. Variations in flow rate have only a small effect on the position of the interface 3.6 in the example of FIG. 5 and on the level difference 3.7-3.8 in the example of FIG. 4.

Figure 1E:
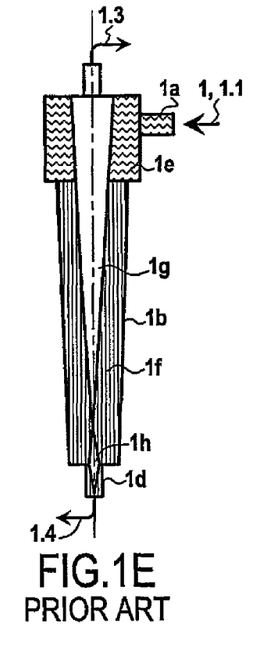

The main enclosure device described above with reference to cyclones of the invention also operates with conventional cyclones, but conventional cyclones are generally very long and therefore more difficult to integrate within a main enclosure, and in addition, since their stable operating point is quite narrow, they become unusable when variations in oil/water proportions or in flow rate are large because of the danger of pockets of oil being entrained, as explained with reference to FIG. 1E, whereas cyclones of the invention adapt well to such instabilities in variations of flow rate and of oil/water fractions in the crude oil.

The operation of the device of the invention is thus self-adaptive, since the cyclones present a broad operating range, thus making them capable of absorbing large variations in water and gas percentages, said variations being subsequently stabilized in the main enclosure 5 in which the pressure is the pressure created by the gas coming from the oil/gas separator situated upstream, prior to being directed to the other treatment equipment.

In addition, said broad operating range of the cyclones and of the main enclosure makes it possible to envisage using a single piece of equipment throughout the time an oil field is being worked, where this time may be as long as 20 years to 25 years or even more, without it being necessary to change sensitive components, as is the case in the prior art, even though at the beginning of working an oil field produces about 5% water with 95% oil, whereas towards the end of its life it produces 95%-98% water for 5% to 2% oil.

FIG. 6 is a side view in section showing a separation installation of the invention corresponding to the second variant, in which the set of cyclones 2 is incorporated within the main enclosure 5. In order to ensure that all of cyclones 2 connected in parallel operate in stable manner relative to one another, thereby avoiding creating instabilities within the set, it is important for the paths followed by the fluids to be identical and to be as short as possible, so that head loses are practically identical for each of the cyclones. To do this, the set of cyclones, e.g. six, eight, or 12 cyclones, is installed inside a diffuser 4.3a connected to the pipe 4.3 for feeding degassed crude oil, said cyclones being assembled thereto in leaktight manner, e.g. by welding at 4.3b at the top portions of said cyclones, and at 4.3c further down said cyclones, so that the diffuser 4.3a does not communicate directly with the main enclosure 5, but communicates only with the tangential inlets 2a of the cyclones 2. The top axial orifices 2b of each of the cyclones communicate directly with the upper portion of the main enclosure in the zone where the oil separated from the water naturally collects merely under gravity.

Similarly, the bottom orifices 2c from each of the cyclones communicate directly with the bottom portion of the main enclosure, preferably directly into the zone where water accumulates.

The assembly then operates identically with the operation described with reference to FIGS. 4 and 5.

In order to be able to act on the internal elements, if the enclosure is spherical, then it is advantageously made as two half-shells that are welded to respective flanges 5a that are assembled together at 5b by bolts (not shown), with sealing being provided by an O-ring 5c.

Figure 6A:
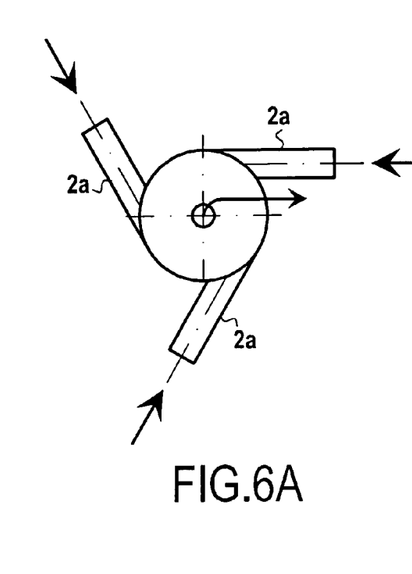
FIG. 6A is a plan view of a cyclone having three admission orifices for crude oil to be processed, the orifices being uniformly distributed around the periphery of said cyclone.

In the descriptions of the invention, in order to clarify the drawings, the cyclones are shown as having a single admission orifice 3a, however it is advantageous to inject the fluid for separation via two, three, or four, or even more identical orifices that are uniformly distributed around the periphery, as shown in FIG. 6A, so as to increase the stability of the swirling flow created at the top of the cyclone, which stability then has repercussions over the entire water/oil separation column and correspondingly increases the stability of the device as a whole.

Figure 7:
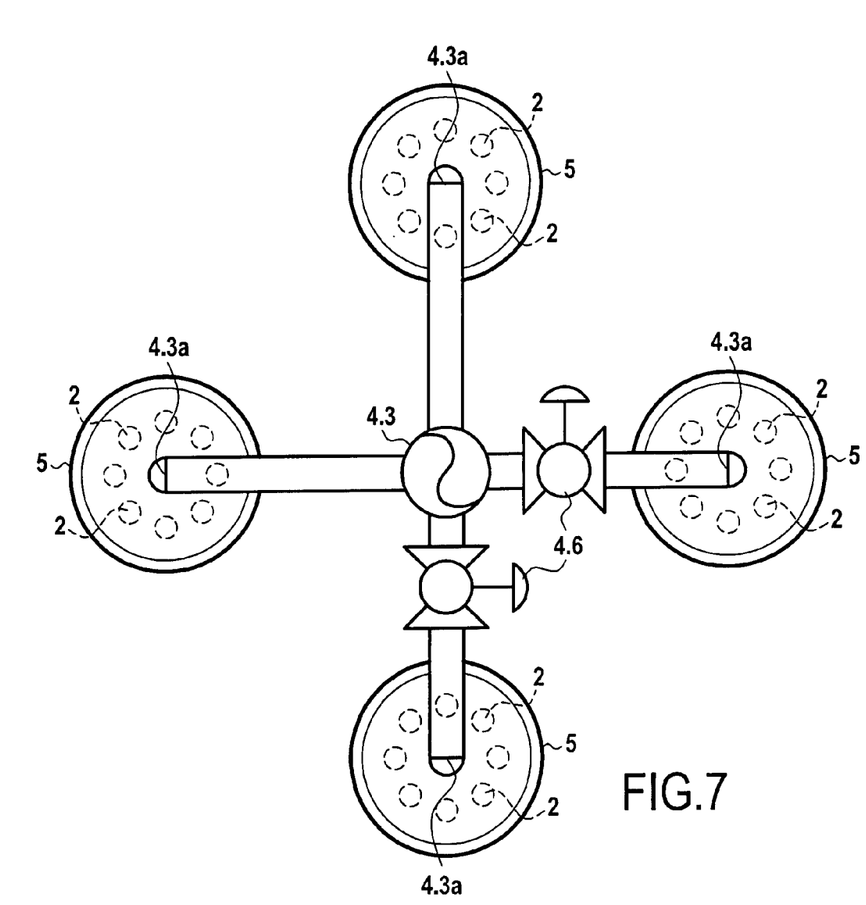
FIG. 7 is a plan view of an installation comprising a set of four FIG. 6 devices assembled symmetrically about a main inlet pipe for oil for treatment.

FIG. 7 is a view seen from above of four FIG. 6 devices connected in parallel, the four main enclosures 5 being connected via their diffusers 4.3a and identical secondary pipes to the pipe 4.3 for feeding degassed crude oil, thereby ensuring complete symmetry in terms of paths followed by the incoming fluid, and thus in terms of head losses. Similarly, the discharge orifices (not shown) present the same symmetry, thus ensuring that the device of the invention operates in stable manner regardless of the number of cyclones within a given main enclosure, and regardless of the number of identical enclosures interconnected in completely symmetrical manner. Advantageously, isolating valves 4.6 are added, preferably of the ball valve type, thus enabling one or two enclosures 5 to be isolated as a function of the water flow rate and of the water/oil ratio in the crude oil, thereby correspondingly increasing the operating flexibility of the device over the lifetime of an installation, i.e. 20 to 30 years or more, without it being necessary to modify the assembly, even though, over time, the crude oil produced generally contains more and more water and less and less oil. These valves, shown in FIG. 7 on two adjacent main enclosures, are preferably installed on two main enclosures that are opposite, so as to produce a system that is more symmetrical.

It remains within the spirit of the invention to consider a device of the first variant, i.e. including an internal partition 5.6, in which the set of cyclones is incorporated inside the main enclosure as described with reference to FIG. 6, but they then need to be placed horizontally. The top outlet orifices 2b from the cyclones then need to be directed towards the right-hand portion into the oil zone, whereas the bottom orifices 2c need to be directed to the left, into the water zone of the main enclosure, even though that does lead to asymmetries in the hydraulic circuit of the cyclones and thus to risks of the assembly becoming unstable, and therefore does not constitute the preferred version of the invention.

By way of example, a cyclone of the invention presents a diameter of 50 mm to 70 mm and a body length of 300 mm to 400 mm. The inlet orifices 2a for crude oil are three in number, and where they are connected to the cylindrical body of the cyclone they present a section that is rectangular having a height of 20 mm and a width of 1 mm. The cyclone is capable of handling a flow rate of about 1 liter per second (L/s) to 1.5 L/s, and it creates a head loss of 2 bars to 3 bars between the inlet orifice 2a and the outlet orifices 2b, 2c.

For production of 10,000 barrels per day, i.e. 1590 cubic meters per day (m³/day), or indeed 18.4 L/s, 16 cyclones of the invention are installed in a spherical enclosure having an inside diameter of 1.5 m and made up of two hemispheres as shown in FIG. 5, thus representing a total volume of 1.77 cubic meters (m³) which corresponds, assuming a mean filling level of 50% for the main enclosure, to a mean travel time for fluids through said main enclosure of 48 seconds (s), referred to as "transit" time. It is then considered advantageous for the time constant of the overall regulation system to be 10% of the transit time, i.e. about 5 s, which makes it possible to use very conventional regulation means, and thus to avoid using the very high performance regulation means that are required by prior art devices.

The tangential speed at the inlet to the cyclones is 19.2 meters per second (m/s) which corresponds for a cyclone having an inside diameter of 60 mm, to a centrifugal acceleration of 1250 g.

For offshore production in very deep water, at a rate of 8000 to 15,000 barrels per day, it is advantageous to use a single main enclosure. At greater rates, it is preferred to place a multiplicity of enclosures 5 in parallel, as shown in FIG. 7, since each sphere needs to withstand implosion and therefore needs to have a wall thickness that is very great, and a spherical shape that is practically perfect, where making such machined forgings becomes extremely expensive with increasing size.

When the device is installed on land, sufficient space is generally available and it is then advantageous to make use of the independent configurations of FIG. 4 or 5, while taking care to ensure symmetry in the hydraulic circuits between the cyclones and the main enclosure, which can be achieved simply by installing said cyclones around said enclosure at a constant distance and preferably with a uniform distribution, the pipe 4.3 for feeding degassed oil being constituted by a circular ring providing a uniform feed to each of said cyclones. In this configuration, the enclosure may be cylindrical with a vertical axis, and then has rounded end walls.

On board an FPSO, available space is very limited and it is then advantageous to integrate the cyclone inside the main enclosure, which enclosure may itself also be cylindrical with a vertical axis and rounded end walls, being assembled by using flanges 5a.

When the device is installed on the sea bed, and more particularly in ultra-great depths, i.e. in the range 2000 m to 3000 m, or even more, it is preferable to integrate the cyclones in a main enclosure of spherical shape since when designing the system it is necessary to assume that the entire device can be filled completely with gas and connected to the surface, i.e. that the pressure inside the device is atmospheric pressure. The pressure outside the device, i.e. about 10 megapascals (MPa) for a depth of 1000 m then bears fully against the main enclosure tending to cause it to implode. Using a spherical shape provides best resistance to said bottom pressure.

The method, cyclone, and installation of the invention are described above in the context of utilization with oil, however they are also applicable to any process in which it is desired in simple and effective manner to separate two liquid phases of different densities, whether similar or very different, in particular in the agrifood business, in recovering industrial oils, and in any application where it is desired to separate two liquids of similar densities in effective manner.

When it is desired to reject the separated-out water directly into the sea, it is necessary to comply with acceptable levels of oil residue in the water, so it is advantageous to install a second separator device of the invention at the water outlet 5.3 in order to achieve the desired level of purity.

What is claimed is:

1. A process for separating two liquid phases of different densities in a fluid, the phases having a higher density aqueous phase and a lower density oil phase in crude oil using a liquid/liquid separation cyclone, the cyclone comprising:
   a separation chamber;
   a top axial liquid outlet orifice for the lower density oil phase at the top end of said chamber;
   at least one tangential admission orifice positioned below said top axial liquid outlet orifice for the fluid to be separated;
   a bottom liquid outlet orifice for the higher density aqueous phase; and
   a circular planar platform positioned over said bottom outlet orifice;
   wherein said separation chamber consists essentially of a single cylindrical body which extends at least between said admission orifice(s) and said platform on the same axis as said cylindrical body, the platform being of diameter smaller than that of said cylindrical body;
   the process comprising the steps of:
   feeding said tangential admission orifice with said fluid to be separated,
   forming two volumes of the two liquid phases of different densities, the volumes comprising a central volume of the lower density oil phase in the form of a substantially cylindrical central column supported by said platform, and an annular peripheral volume of the higher density aqueous phase surrounding said central column,
   recovering the lower density oil phase of said fluid at said top axial liquid outlet orifice,
   recovering the higher density aqueous phase at said bottom liquid outlet orifice, and
   enabling the lower density oil phase to be discharged via said top axial outlet orifice and said higher density aqueous phase to be discharged via said bottom outlet orifice, the separation chamber being free of any structural element between said admission orifice(s) and said platform that could substantially interfere with the formation of the central and annular peripheral volumes.

2. The process according to claim 1 wherein in said separation cyclone a diameter of said bottom liquid outlet orifice is greater than a diameter of said top axial liquid orifice.

3. The process according to claim 1, wherein an interface between said two volumes can move radially on said platform when the relative proportions of the two liquid phases making up the composition of the fluid for separation vary, without affecting the separation of said two liquid phases.

4. The process according to claim 3, wherein the separation chamber is free of a structural element that substantially interferes with the formation of the central and annular peripheral volumes of the two liquid phases having different densities, and wherein the space between the entire circumference of said platform and the wall of the cylindrical body is entirely void.

5. The process according to claim 1, wherein said separation chamber is constituted by a single cylindrical body extending between said admission orifice and said bottom outlet orifice, said bottom outlet orifice being a tangential outlet orifice, and said platform being positioned at the bottom end of said cylindrical body immediately upstream from said bottom tangential outlet orifice.

6. The process according to claim 1, wherein the bottom portion of said chamber situated between said platform and said bottom outlet orifice is conical in shape about the same axis as said cylindrical body, and said bottom orifice is an axial outlet orifice extending in the axial direction of said cylindrical body.

7. The process according to claim 1, wherein said bottom orifice comprises head-loss means at said bottom outlet orifice for reducing the pressure of the aqueous heavy phase at the outlet from said separator.

8. The process according to claim 7, wherein the head-loss means imparts head loss proportional to the acceleration of the fluid.

9. The process according to claim 8, wherein the head-loss means further comprises a perforated plate or a diaphragm located downstream from the bottom outlet orifice.

10. The process according to claim 1, wherein the diameter of said platform lies in the range $\frac{1}{2}$ to $\frac{98}{100}$ of the diameter of said cylindrical body.

11. The process according to claim 1, wherein the diameter of said platform is greater than $\frac{3}{4}$ of that of said cylindrical body.

\* \* \* \* \*